United States Patent [19]

Brod

[11] Patent Number: 4,591,852

[45] Date of Patent: May 27, 1986

[54] RECORDING LOCK SYSTEM

[76] Inventor: Meyer C. Brod, 5349 Newcastle Ave., Encino, Calif. 91316

[21] Appl. No.: 605,258

[22] Filed: Apr. 30, 1984

[51] Int. Cl.[4] ........................ H04Q 9/00; E05B 49/00

[52] U.S. Cl. ................................ 340/825.31; 70/362; 70/433; 361/172

[58] Field of Search ...................... 340/825.31, 825.32; 235/382; 361/172; 346/41, 42, 33 R; 70/433, 362

[56] References Cited

U.S. PATENT DOCUMENTS

| | | | |
|---|---|---|---|
| 3,825,898 | 7/1974 | Miller | 340/825.31 |
| 3,854,120 | 12/1974 | Matto et al. | 340/825.32 |
| 4,257,030 | 3/1981 | Bruhin et al. | 340/825.31 |

*Primary Examiner*—Donald J. Yusko
*Attorney, Agent, or Firm*—Roger A. Marrs

[57] ABSTRACT

An automatic system for identifying an authorized key utilized to lock and unlock a door lock and to record pertinent data attendant thereto is disclosed herein having a key sensing mechanism incorporated into a lock that operates a switch circuit to generate a key identification signal. A control circuit receives the signal as well as time and date information and introduces this data to a printer for producing a visual record of the door lock transaction. The authorized key is coded not only to lock and unlock the door lock but includes a plurality of identification number codes along a given length.

1 Claim, 9 Drawing Figures

FIG. 1
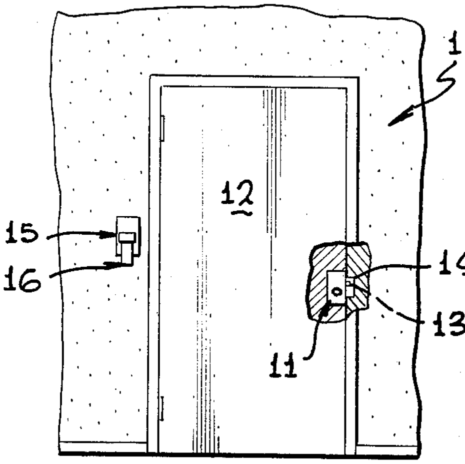
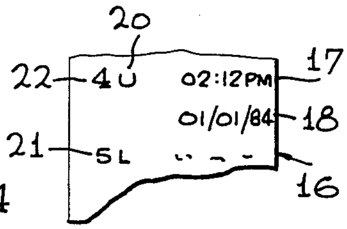
FIG. 2
FIG. 3
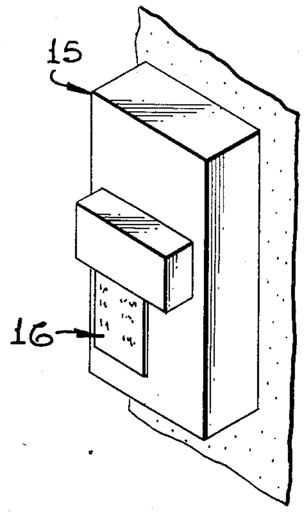
FIG. 4
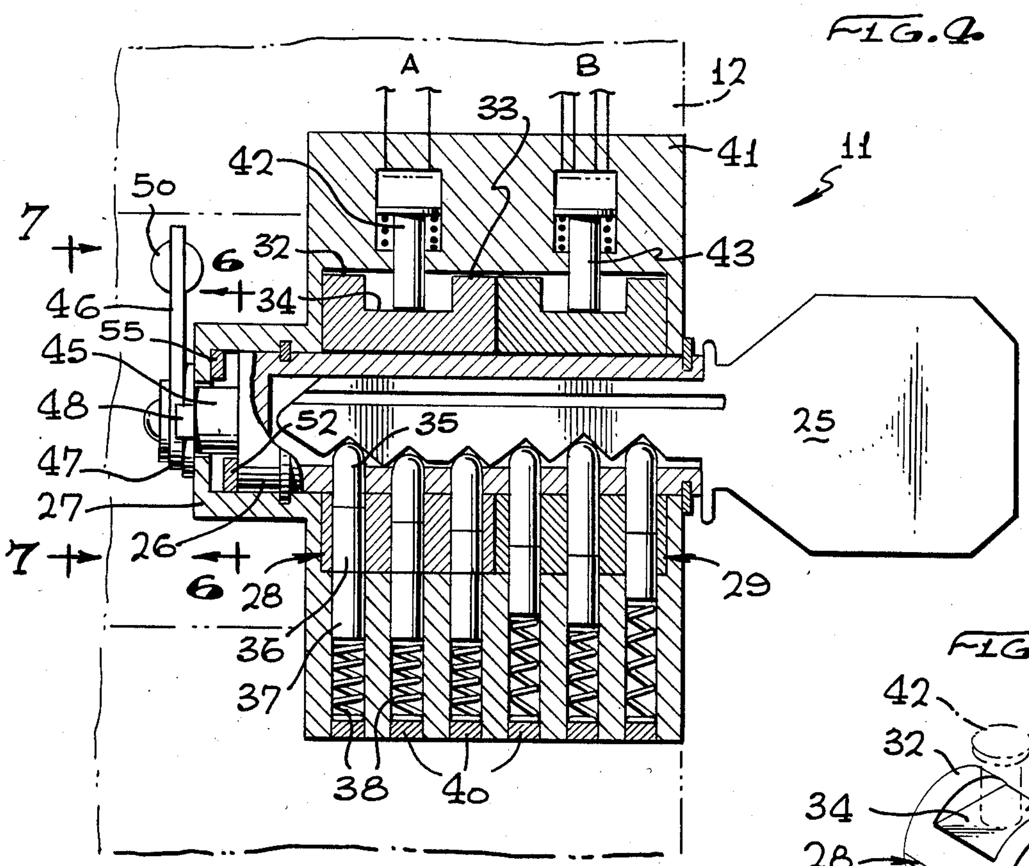
FIG. 5
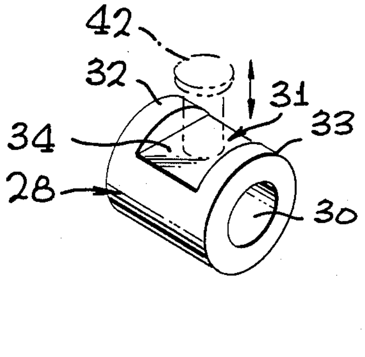

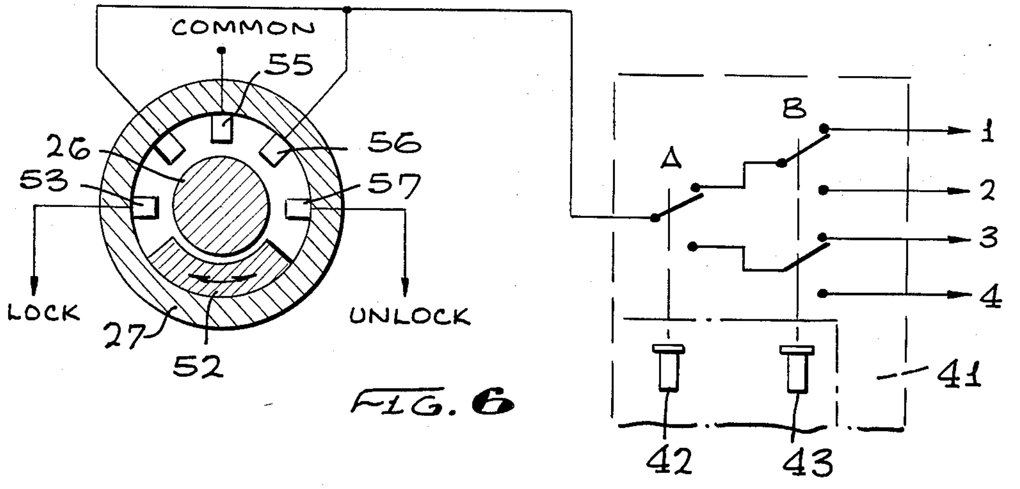
FIG. 6
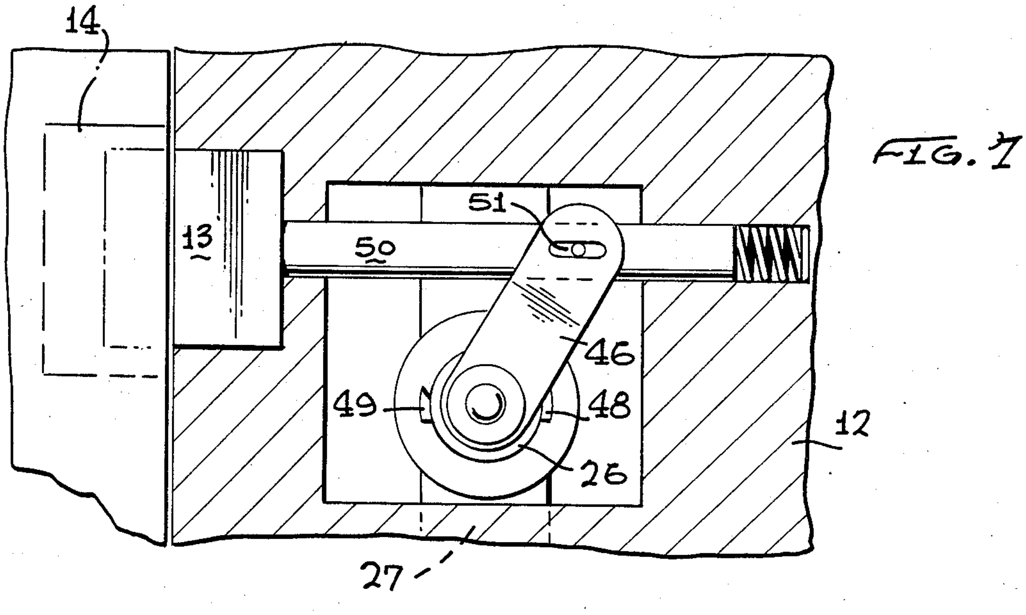
FIG. 7
FIG. 8
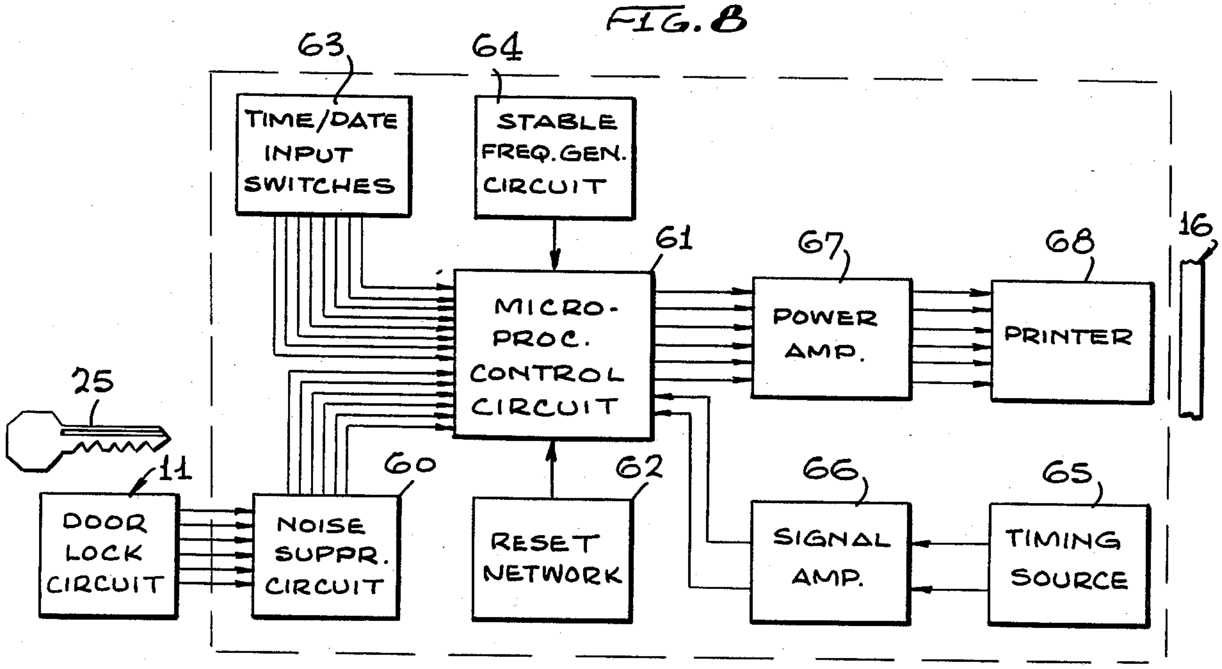

RECORDING LOCK SYSTEM

BACKGROUND OF THE INVENTION

1. Field of the Invention

The present invention relates to recording lock systems and, more particularly, to a novel such system which not only identifies the key but provides a printed record of the identifying characteristics of authorized users and time/date data and the lock or unlock transaction taken place.

2. Brief Description of the Prior Art

In the past, automatic lock transaction recorders have been employed which generally produce a graph type record or a printed record utilizing coded symbols. Such records are awkward to read and interpret. Also, prior systems use key coding to identify authorized personnel by employing keys of different lengths which greatly limits overall number of identifications available in the system and renders longer keys impractical to carry.

Furthermore, most prior locks and coding mechanisms are suited to be installed on the exterior surface of the door so that keys of extra length can be accommodated. This procedure is undesirable since tampering with the system components is made possible.

Therefore, a long standing need exists to provide a system having multiple keys of the same length incorporating a multiplicity of individual identification codes and which is installed into the interior framing of the door.

SUMMARY OF THE INVENTION

Accordingly, the above problems and difficulties are obviated by the present invention which provides a recording lock system for printing a visual record of door lock transactions including a coded key operable to actuate a coding switch to produce authorized personnel identification signals. Such signals are received by a control circuit along with time and date data for processing to a printer via a power amplifier. A timing source produces clock pulses while a stable frequency generator is coupled to the control circuit for stabilizing the frequency output thereof. Noise suppressor circuit means and reset network means are operably connected to the control circuit as well.

Therefore, it is a primary object of the present invention to provide a novel recording lock system involving a lock turnable by the insertion of any one of a selected plurality of keys and having means for providing a signal indicative of the particular one of the plurality of keys used to turn the lock whereby a printed record is produced including the identifying key number as well as time/date data and lock or unlock transactional information.

Another object of the present invention is to provide a novel recording lock system involving a selected plurality of keys having individual identification codes wherein all of the keys are of the same length.

Another object of the present invention is to provide in a key lock and printer recorder combination, a record means or system for producing a record of a particular key from a plurality of keys employed to open the lock, means for producing a printed recording of the key identification and transactional data and which may be readily installed within the thickness of a door frame.

Yet another object of the present invention is to provide a novel recording lock system involving the provision of a signal generating means operatively associated with a rotary lock for producing an identification signal in response to rotary movement of the lock so as to actuate a bolt between the locking and unlocking positions and which further includes recording means for producing a printed record of the transaction.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a front elevational view, partly broken away, illustrating the novel recording lock system of the present invention having the rotary lock means and signal means carried on the inside of the door frame and a standard printer located remotely on a wall nearby;

FIG. 2 is a elevational view of a typical recorded printout on a paper tape produced by the printer employed in the system of FIG. 1;

FIG. 3 is an enlarged perspective view of the printer for producing the tape shown in FIG. 2 in response to the signals produced by the signaling means in the system of FIG. 1;

FIG. 4 is an enlarged longitudinal cross-sectional view of a lock mechanism employed in the system showing a key inserted into the receiving slot thereof;

FIG. 5 is a reduced perspective view of an intermediate sleeve used in the rotary lock shown in FIG. 4;

FIG. 6 is a diagrammatic and schematic view of the signal producing means used in the system of FIG. 1 as taken in the direction of arrows 6—6 in FIG. 4;

FIG. 7 is a sectional view of the sliding bolt and mechanism therefor used in the lock employed in the system of FIG. 1 as shown in the direction of 7—7 of FIG. 4;

FIG. 8 is a block diagram of the recording lock system incorporating the present invention.

DESCRIPTION OF PREFERRED EMBODIMENT

Figure 9:
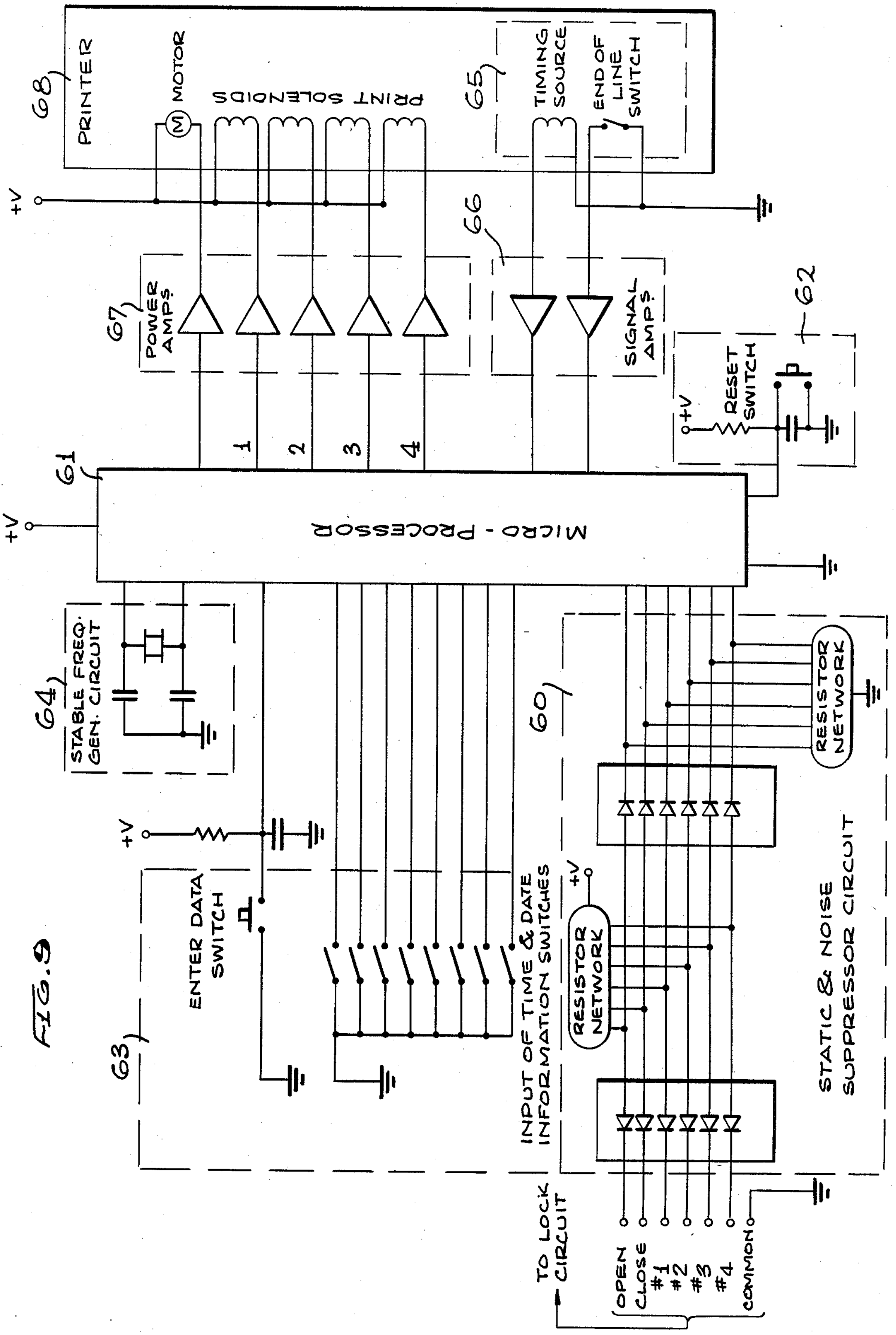
FIG. 9 is a circuit schematic drawing of the electronic components shown in the block diagram of FIG. 8.

Referring to FIG. 1, the novel recording system of the present invention is shown in the general direction of arrow 10 which includes a key lock mechanism and sensing circuit 11 which is mounted within the frame of a door 12. It is to be understood that the door may be of a sliding type, a hinged type or any other type of door closure. Also, the frame may be composed of wood, metal or the like. However, it is important to know that the invention is mounted within the confines of the frame so that only the access to the key slot in the key mechanism in signaling circuit is exposed exteriorally of the frame. The key lock and signaling circuit includes a bolt 13 which is slidably mounted so as to outwardly project from the edge of the door 12 into a receptacle or recess 14 included in the door jamb. When so received in the receptacle, the door is locked and cannot be moved from its closed position to its open position. Upon actuation of the lock, the bolt 13 is removed from the recess and the door can be opened from its closed position.

The signaling circuit included in the lock mechanism and signaling circuit 11 is connected to a printer unit 15 which produces a continuous tape 16 having transactional information carried thereon pertaining to the day and time of door lock transaction and the type of transaction whether it is a lock transaction or an unlock transaction and further includes an identification number of the particular key employed to actuate the lock.

Referring now to FIG. 2, the tape 16 is illustrated and the time of day is indicated by numeral 17 while the date is indicated by numeral 18. The door lock transaction for unlocking is represented by the U identified by numeral 20 while the lock transaction of the mechanism is identified by the L indicated by numeral 21. Identification of the key is by a numeric character such as the number 4 indicated by numeral 22. Other numeric characters are used to identify other keys. The signaling circuit 11 is employed for transmitting transaction, date and identification numerical information to the printer.

Referring now in detail to FIG. 4, the lock and signaling device 11 is illustrated and it can be seen that the lock is of a cylinder type which is operated by the insertion of a key 25 into a slot formed in an inner cylinder 26 which is rotatably mounted in a body 27 fixed to the frame of the door 12. Located within the body 27 and selectively rotatable therein are a plurality of intermediate sleeves such as sleeves 28 and 29 which are rotatably mounted about the outer periphery of the cylinder 26. A typical intermediate sleeve is shown in FIG. 5 and it is to be understood that two or more sleeves can be included within an assembly depending upon the number of key identifications which are required. The typical intermediate sleeve 28 is substantially round including a central bore 30 which receives the inner cylinder 26 and further includes a cut-out indicated in general by numeral 31 which is defined between the opposing walls 32 and 33. A flat surface 34 extends between the opposing walls 32 and 33.

The inner cylinder 26, each of the intermediate sleeves 28 and 29 and the body 27 include passageways which are in alignment so as to respectively hold at least three tumblers or pins which are aligned in end to end relationship in each of the respective aligned passageways. For example, the first passageway in alignment includes pin identified by numeral 35 in the passageway of inner cylinder 26 and partially projecting into the passageway of the intermediate sleeve 28 while another pin 36 resides substantially in the passageway of intermediate sleeve 28 and bears against pin 37 including in the passageway of the body 27. All of the pins are engaged in end to end relationship by expansion of a spring 38 carried in the passageway which bears against a knock-out plug 40. A feature of the invention resides in the fact that the length of each of the pins in each of the passageways is different as well as the length of each of the pins in adjacent passageways is different. Therefore, when the key 25 is inserted into the slot of the inner cylinder 26, the various cut-outs in the key will cause the respective linear arrangement of pins to line up with respect to the parting line of the inner cylinder 26 with the sleeves 28 and 29 and the parting line of each of the respective intermediate sleeves with the body 27.

Therefore, as illustrated, the uppermost pin 35 associated with the inner cylinder extends downwardly into the passageways of sleeve 28 so as to prevent rotation of the sleeve when the inner cylinder is rotated. Also, the intermediate pin 36 in each of the passageways of the intermediate sleeve 28 terminate at the parting line between the exterior surface of the sleeve 28 and the bore of the body 27 so that no interference exists whereby the intermediate sleeve 28 will now rotate via the connection of the sleeve with the inner cylinder by means of the cylinder pin 35. The body pin 37 in the body passageway terminate at the parting line of the sleeve 28 with the body so that no interference exists and rotation of the sleeve is permitted. On the other hand, the cylinder pins associated with sleeve 29 terminate at the parting line between the cylinder and the sleeve 29 so that rotation at this point is permitted while the body pins and sleeve pins associated with sleeve 29 cross the parting line between the sleeve and the body so as to prevent rotation of the sleeve 29 with respect to the sleeve in the body. Therefore, in the condition shown in FIG. 4, when the key 25 is rotated the cylinder 26 will rotate and sleeve 28 will rotate because of the inner connection of pins 35 betwen the cylinder and the sleeve and sleeve 29 will not rotate because the sleeve pins and body pins cross the parting line between the sleeve and the body to prevent rotation. The terminating ends of the pins along the parting line between sleeve 28 and the body and the terminating of pin ends along the parting line between the cylinder and sleeve 29 will prevent the rotation of sleeve 29.

By means of the above mechanism, the coded key information is translated into a mechanical movement by the rotation of intermediate sleeve 28 which serves to operate a signaling circuit included within a switch box 41. The switch box includes a spring loaded plunger 42 which projects through the switch box into the recess 31 between the shoulders or walls 32 and 33 of the sleeve 28. However, when the sleeve 28 is rotated as previously described, the plunger 42 will ride against the circular exterior of the sleeve and cause its opposite end to bear against contact closures represented by the letter A. Therefore, a signal is initiated upon closure of the contact which represents the particular key 25 which has been inserted into the lock and turned.

Therefore, it can be seen that should another key be inserted into the cylinder slot 26 which would permit rotation of the sleeve 29 to the exclusion sleeve 28, a second plunger 43 would close the contact closures associated with the circuit B that would, in turn, initiate another identification signal corresponding to the key that was inserted and turned. As many different keys may be inserted whereby one or more combined intermediate sleeves initiate as many identification signals as is desired. To add additional identification numbers without extending the length of the key, it is only necessary to provide shorter intermediate sleeves. For example, if a third identification circuit is intended to be included in the embodiment shown in FIG. 4, it is only necessary that separate sleeves be included that contain two passageways for the pin and further, sleeves containing only a single passageway may be included. In this manner, the identification of a plurality of keys may be expanded while employing a multiplicity of keys of the same length.

FIG. 4 illustrates that the inner cylinder 26 includes a stub shaft or portion 45 which rotates within a bore of body 27 and outwardly projects therefrom to terminate in a lever arm 46. The stub shaft 45 is of reduced diameter from the diameter of the inner cylinder 26 and carries the arm 46 in a fixed position. The arm includes a circular portion 47 which is provided with a pair of tabs 48 and 49, such as is illustrated in FIG. 7, which rotate to follow the movement of the cylinder 26 as it is turned by the key 25. As illustrated in FIG. 7, as the cylinder rotates counterclockwise, the edge of tab 48 will bear against one side of ther arm 46 causing the arm to move bolt 13 into the recess 14 via connecting rod 50. Therefore, when the key and cylinder 26 are rotated in a counterclockwise direction, the bolt 13 is moved into a locking relationship with respect to the door Jamb. Later, to unlock the door, the key and cylinder 26 are rotated in a clockwise direction which causes the tab 49 to bear against the other side of arm 46 and to withdraw the bolt 13 from the recess 14. A lost motion arrangement is established between the slot and pin construction identified by numeral 51 so that the movement will operate and function smoothly.

Referring now in detail to FIGS. 4 and 6, it can be seen that a space exists between the front face of the major diameter of cylinder 26 and the opposing face of the body 27 which surrounds and rotatably mounts the stub shaft 45. This space is occupied by switch contacts which provide electrical energy for transmitting the identification signals of the respective keys and for applying current to establish signals identifying a lock or unlock transaction. To effect energization, an elongated segment 52 is carried on the front face of the major diameter at the end of the cylinder 26 and is rotated either clockwise or counterclockwise following the movement of the key and cylinder. A plurality of contact segments are fixed to the opposing surface on body 27 establishing a cavity and such segments are identified by numerals 53, 54, 55, 56 and 57 respectively. Contact segments 53 and 57 are associated with lock and unlock transactions while contacts 54 and 56 are associated with identification contacts and switch 41. Contact 55 is directly coupled to complete the circuit so that current is applied in the signaling circuit to the lines connected to the segments 53, 57 and to the outputs of the switch circuit 41. Therefore, when the cylinder 26 is rotated in a counterclockwise direction, the elongated segment contact 52 connects contacts 55, 56 and 57 together causing current to flow initiating an unlock signal and initiating a key identification signal along selected output lines identified by numerals 1, 2, 3 or 4 from switch box 41. The particular identification signal is also established by the position of switches A or B as determined by the plungers 42 and 43 as previously described.

When the cylinder 26 is rotated in a clockwise direction, the switch contact 52 will engage with contacts 53, 54 and 55 so that current will flow through the lock transaction circuit and through the identification circuit. Therefore, in view of the foregoing, it can be seen that when the key is inserted into the cylinder 26 slot, particular intermediate sleeves are selected for rotation and these sleeves, in turn, will actuate identification plungers 42 and 43 according to the key inserted. Once rotation takes place of cylinder 26, in either a clockwise or counterclockwise direction, transaction signals pertaining to lock and unlock are initiated in addition to identification numbers. Either one or both of the intermediate cylinders 28 or 29 can be rotated and by employing a binary code system, switches A or B or both are actuated to produce identification numbers 1–4 on the respective output lines from the switch box 41.

As illustrated more clearly in FIG. 8, the entire recording system is presented in block form so that the signals generated by the door lock circuit 11 are introduced to a noise supression circuit which eliminates spurious and undesired noise which may develop from an AC line or the like. The signals are then introduced to a microprocessor control circuit 61 which is a product manufactured by Intel Corporation, Santa Clara, Calif., under part number D8748. The noise suppressor circuit is identified by numeral 60 and prevents spurious signals from nearby circuits such as fluorescent lights, food mixers, kitchen appliances or the like from interfering with the established identification and lock transaction signals. A reset network 62 is provided for resetting the microprocessor to a desired time of day and date sequence in cooperation with manually operated time and date input switches 63. A stable frequency generator circuit 64 is included for stabilizing the microprocessor control circuit while a timing source 65 is connected to the control circuit 61 by signal amplifier 66 for purposes of timing the respective control function. The output from the micro circuit is processed through power amplifiers 67 for introduction to a conventional dot matrix printer 68. Such a printer is conventional and does not form part of the present invention other than for its use in printing the desired information on the paper strip 16.

Referring now in detail to FIG. 9, a circuit diagram is illustrated showing the circuit and logic components included in the respective blocks of the block diagram in FIG. 8. The electrical leads from the switch box 41 are conducted through the door 12 and via a conventional jumper cable or connector between the edge of the door and the jamb to the printer unit 15. The leads are coupled to the static and noise suppressor circuit 60. Manual switches included in the entry circuit 63 may be used to set the date and time clock in cooperation with the reset switch 62.

The key 25 is a special blank not intended to be available to the general public. The coded notches are intentionally maintained secret and are identifiable via the circuit and printer 68 on the tape 16.

In view of the foregoing, it can be seen that the present invention provides a unique access control device combining a dead-bolt lock and hard-copy recorder. For every locking and unlocking transaction, the device or system records the day and time and identifies which key from a plurality of keys is used to perform the locking or unlocking transaction. The device records locking and unlocking of the door whether it be hinged, sliding or roll-up, glass, metal frame, grill, solid wood, metal or metal-clad. The device is mounted into the door or door frame and is not intended for external attachment to the door or the door frame or the door jamb.

Normal insertion and turning of the key locks or unlocks the bolt and activates the recorder's key identification and print mechanisms. Recordings are made on paper tape and the time and date are punched numerically as well as the key identification number. The date change is automatically printed each midnight. Although a plurality of keys are used, each key is of the same length and code identification for each key is made by the indentations in the key and the number of code identifications available is determined by the number of intermediate sleeves provided about the lock cylinder.

While particular embodiments of the present invention have been shown and described, it will be obvious to those skilled in the art that changes and modifications may be made in its broader aspects and, therefore, the aim in the appended claims is to cover all such changes and modifications as fall within the true spirit and scope of this invention.

What is claimed is:

1. An automatic system for identifying an authorized key utilized to lock and unlock a bolted door lock and to record pertinent data attendant thereto on a printed sheet, the combination which comprises:

an authorized key of a given weight having coded notches along an edge;

a door lock;

a key sensing mechanism carried on said door lock responsive to said authorized key coded notches for actuating said door lock;

a switch circuit operable in response to said key sensing mechanism and said door lock actuation to generate key transaction signals;

said door lock and said switch circuit operating simultaneously in response to said key sensing mechanism;

control circuit means coupled to said switch circuit for receiving said key transaction signals and for producing time and date signals associated with said key transaction signals.

printer means operatively conncted to said control circuit for receiving said key transaction signals and said time and date signals for recording onto said printed sheet;

said key sensing mechanism includes a body having a concentric inner cylinder with a plurality of coaxial cylindrical sleeves arranged adjacent to one another about said inner cylinder;

pin means resiliently mounted to move between said body, said sleeves and said inner cylinder for selectively connecting certain ones of said sleeves to said inner cylinder and certain ones of said sleeves to said body in response to a particular one of said authorized keys whereby said certain ones of said sleeves connected to said inner cylinder rotate and said sleeves connected to said body remain stationary;

said key sensing mechanism further includes fixed electrical contacts on said body matable with movable electrical contacts on said inner cylinder for generating lock and unlock signals to said printer via said control circuit; and each of said key sensing mechanism sleeves includes a recess occupied by a resiliently biased contact movable in response to movement of connected ones of said sleeve with said inner cylinder to initiate said key transaction signals.

* * * * *